United States Patent [19]
Hoeltzenbein

[11] 3,907,687
[45] Sept. 23, 1975

[54] PLATE DIALYZER

[75] Inventor: Josef Hoeltzenbein, Muenster, Germany

[73] Assignee: Baxter Laboratories, Inc., Deerfield, Ill.

[22] Filed: Feb. 8, 1973

[21] Appl. No.: 330,793

Related U.S. Application Data

[63] Continuation-in-part of Ser. No. 161,818, July 12, 1971, Pat. No. 3,730,350, which is a continuation of Ser. No. 880,324, Nov. 26, 1969, abandoned.

[30] Foreign Application Priority Data

| July 26, 1969 | Germany | 1938008 |
| Dec. 7, 1968 | Germany | 6810380 |
| Dec. 27, 1968 | Germany | 6813222 |
| Jan. 27, 1969 | Germany | 6902959 |

[52] U.S. Cl. ............... 210/321; 210/493; 264/258
[51] Int. Cl.² ........................................ B01D 33/00
[58] Field of Search ...... 210/22, 321, 493; 264/257, 264/258; 23/258.5

[56] References Cited
UNITED STATES PATENTS

| 3,396,849 | 8/1968 | Lande et al. | 210/321 |
| 3,411,630 | 11/1968 | Alwall et al. | 210/321 |
| 3,494,466 | 2/1970 | Rose et al. | 210/446 X |
| 3,501,010 | 3/1970 | Critchell et al. | 210/321 |
| 3,516,548 | 6/1970 | Alwall et al. | 210/321 |
| 3,585,131 | 6/1971 | Esmond | 210/321 |
| 3,614,856 | 10/1971 | Sahz et al. | 210/321 X |
| 3,695,445 | 10/1972 | Esmond | 210/321 |
| 3,723,305 | 3/1973 | Radford | 210/321 X |
| 3,827,563 | 8/1974 | Bue et al. | 210/321 |

*Primary Examiner*—Frank A. Spear, Jr.
*Attorney, Agent, or Firm*—Garrettson Ellis; Louis Altman

[57] ABSTRACT

A plate dialyzer is provided with plates and membranes located therebetween. The membranes extend along the front sides of the plates and are bent around the edges of the plates. The ends of the membranes are tightly clamped between two adjacent plates. The plates have channels used for supplying or removing at least one of the dialysis liquids.

23 Claims, 24 Drawing Figures

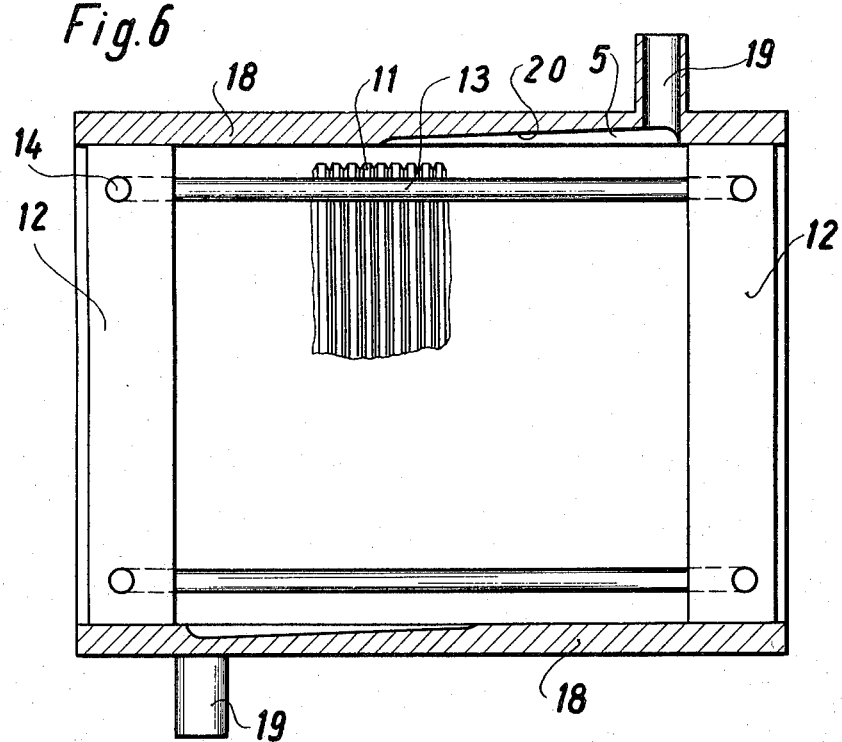
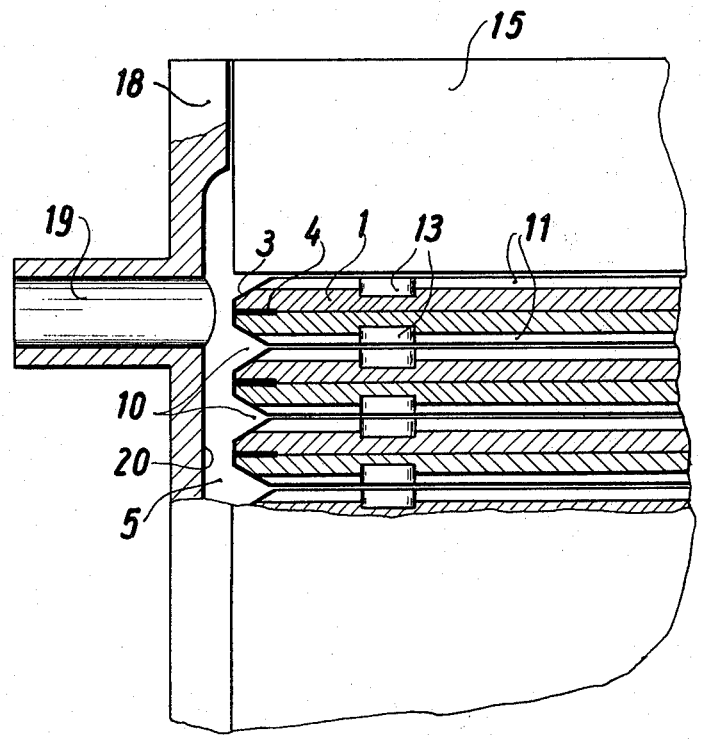

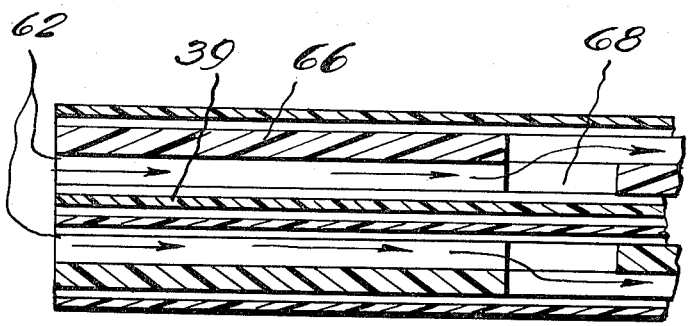
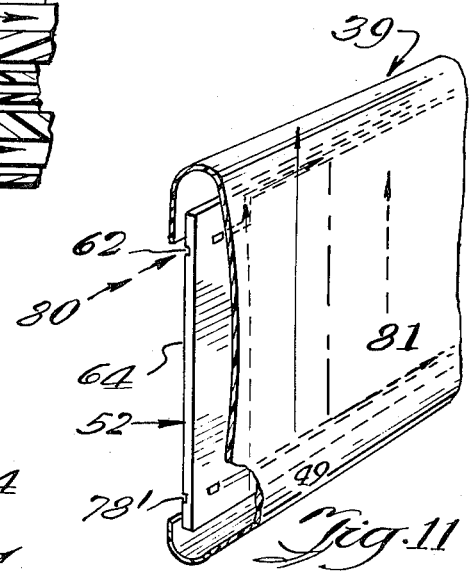
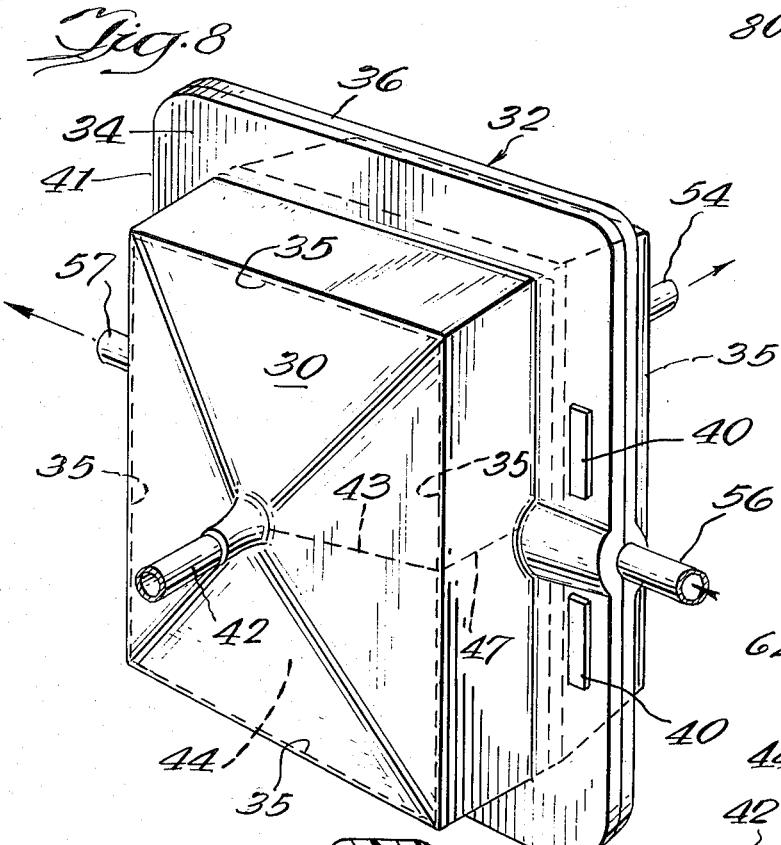
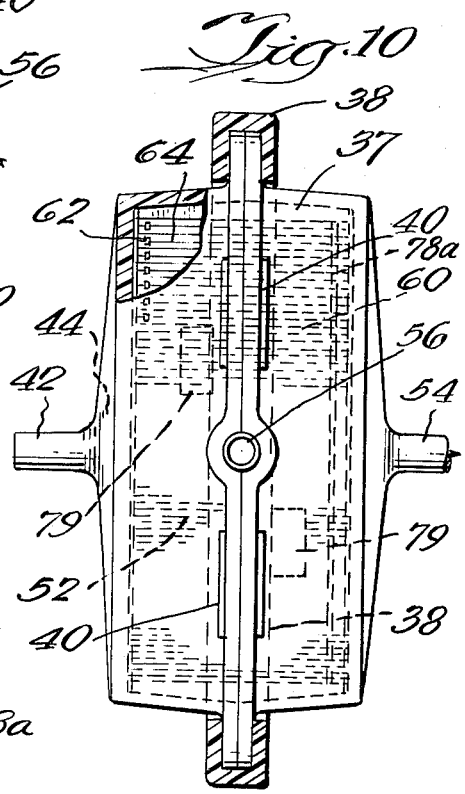
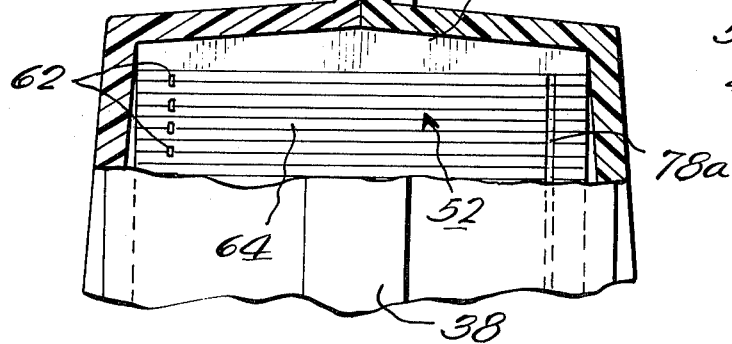

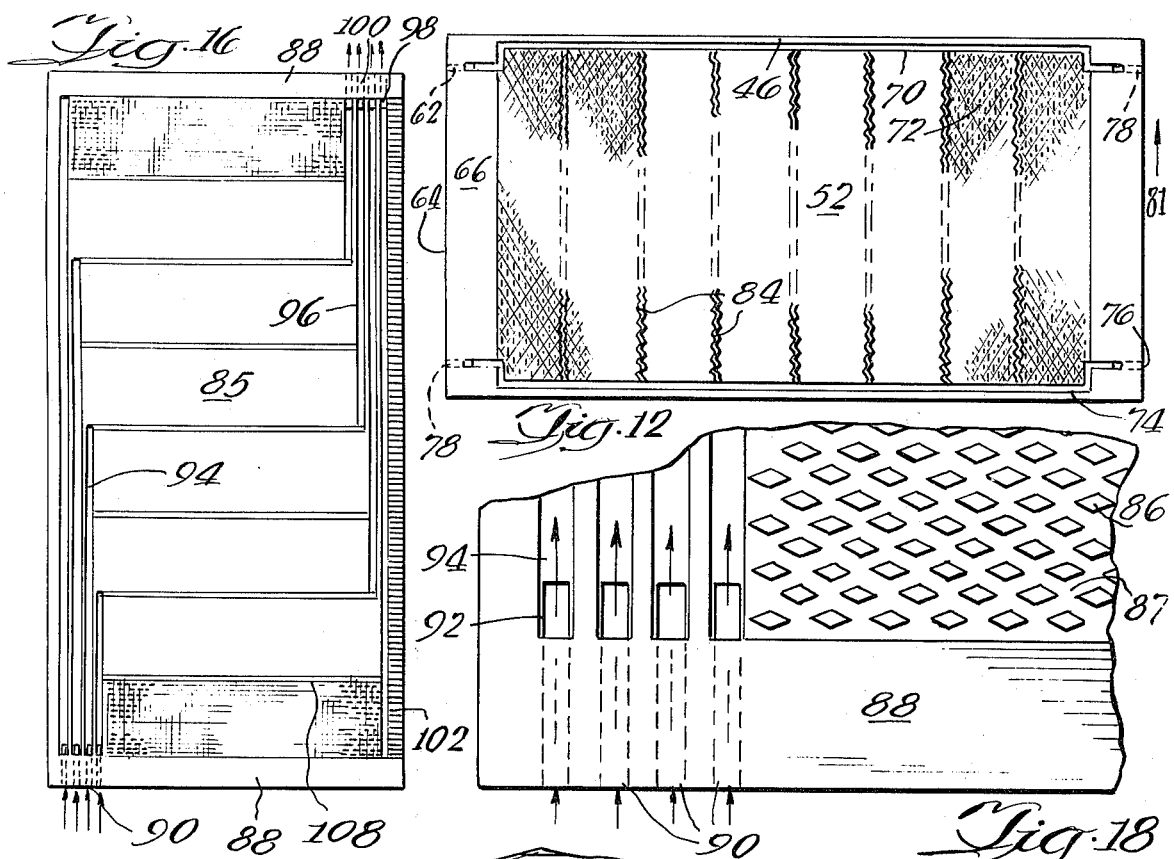
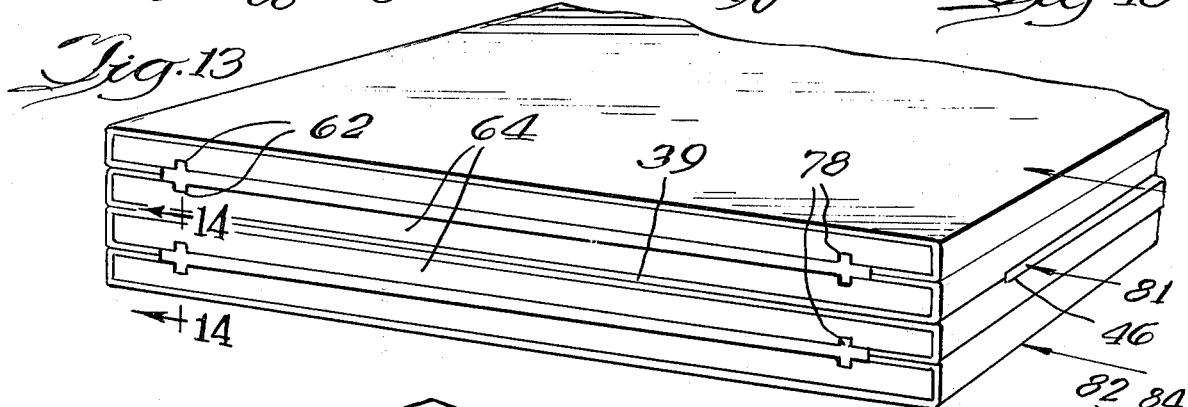
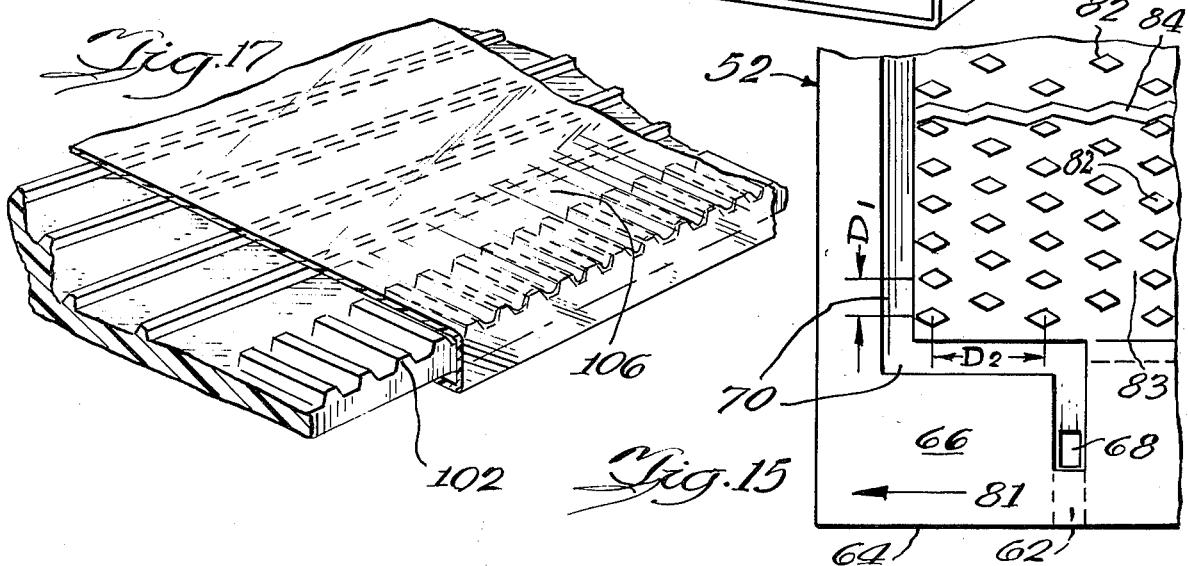

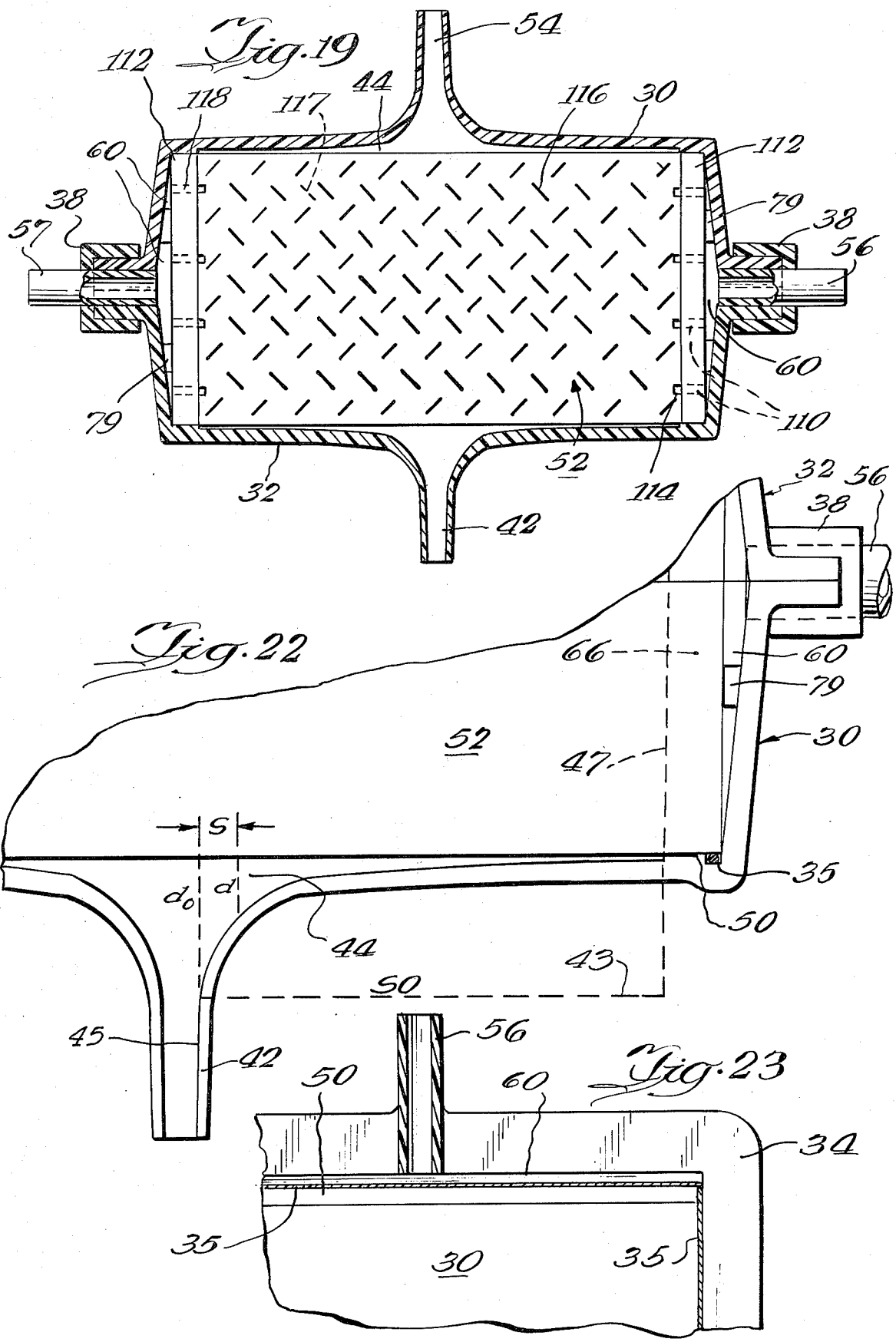

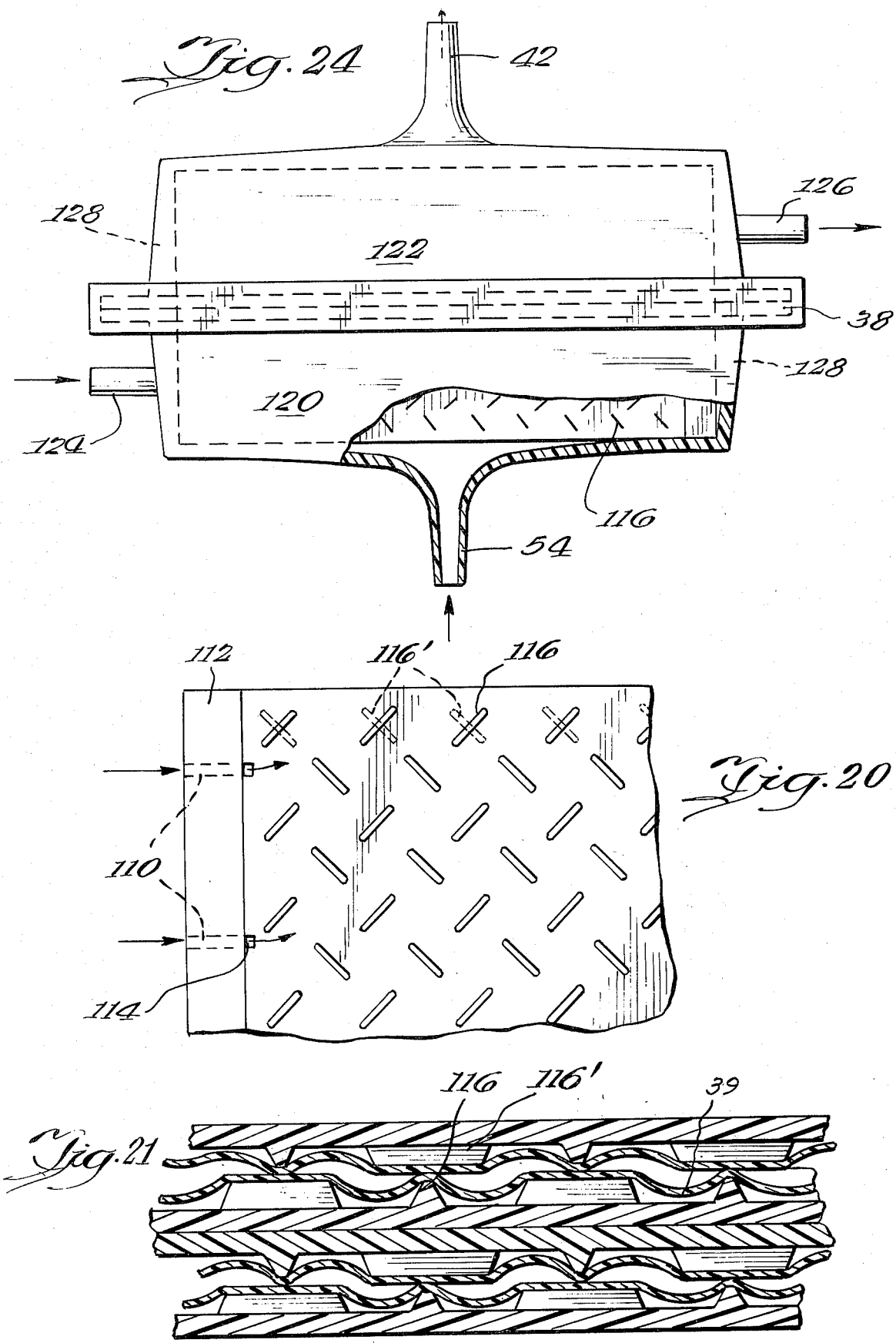

PLATE DIALYZER

CROSS REFERENCE TO RELATED APPLICATION

This application is a continuation-in-part of Application S.N. 161,818, filed July 12, 1971, now U.S. Pat. No. 3,730,350, which in turn is a continuation of Application S.N. 880,324, filed Nov. 26, 1969 abandoned.

BACKGROUND OF THE INVENTION

This invention relates to a plate dialyzer with membranes located between the plates.

Dialyzers have an extensive field of use. They are used for separating solvent-containing liquids, particularly for separating colloids from molecularly dispersed smaller substances which are contained therein. When differently constructed, these plate dialyzers can also be used for exchange between liquids and gases, for example, as artificial lungs; for gas exchange, for example, as artificial gills; or as heat exchangers between two media capable of flowing, depending upon the selection of the membranes which separate the media taking part in the material exchange or heat exchange.

A special field of use for plate dialyzers is that of extracorporeal hemodialysis. In that case, the semipermeable membrane takes over the task of the physiological filter of the glomerulus capillaries. According to the laws of osmosis and diffusion, an exchange of material then takes place between, on the one hand, a blood film applied to one side of the membrane and, on the other hand, a scavenging solution flowing past the other side of the membrane. This use of a plate dialyzer as an artificial kidney is becoming more and more important at the present time, and for that reason, hereinafter special reference will be made to a blood dialyzer.

When artificial kidneys are used, it is necessary on the one hand to keep the blood filling volume as small as possible in order to avoid the use of additional aggregates, such as pumps, heating devices and the like and to avoid blood losses as much as possible, and, on the other hand, to arrange directions of flow within the dialyzer in such manner that there is the greatest possible laminar blood flow. Also, the distances for the blood to flow should be kept as short as possible to avoid damage to the blood.

It is particularly difficult to keep separate the dialysis liquids of a plate dialyzer. This is caused essentially by the fact that blood dialyzers use cellulose membranes which cannot be bonded with a water-resistant seal with the dialyzer plates either by gluing, soldering, or some other similar manner. In blood dialyzers of simpler construction, blood is introduced through a branched channel system into the grooves of dialyzer plates which are covered by the membranes. The scavenging solution flows in the grooves of an adjacent plate, so that a material exchange between the blood and the solution can take place only through the one contacting surface with the membrane, while a much larger surface of the blood is in contact with the inactive dialyzer plate. The efficiency of these dialyzers with respect to blood volume is very small, and furthermore, there is high resistance to the blood flow in the branched passages.

It is therefore desired for blood dialyzers that the blood should flow as a thin film between two membranes so as to provide substantially larger contacting surfaces for the material exchange. However, a great difficulty in such dialyzers consists in properly sealing the space for the blood between the membranes. This is particularly the case at locations through which blood enters between the membranes which are provided between two dialyzer plates. Consequently, in existing dialyzers special connecting and distributing pieces are used as tighteners in the space for the blood between two adjacent plates. For the purpose the plates are provided with recesses into which the connecting and distributing pieces are tightly inserted. This arrangement has, above all, the drawback that these dialyzers are quite expensive; furthermore, due to the necessity of inserting individual connecting and distributing pieces, their assembly requires lengthy operations.

An object of the present invention is to eliminate drawbacks of prior art constructions through the provision of a plate dialyzer of greatly simplified construction which provides complete sealing and separation of the dialysis liquids.

Another object is the provision of such a dialyzer which is of small size with a low blood volume capacity while having large area membrane surfaces available for the material exchange.

Yet another object is the provision of such dialyzer which is inexpensive to manufacture and easy to operate, so that it can be given into the hands of a patient and can be discarded after a single use.

Other objects of the present invention will become apparent in the course of the following specification.

DESCRIPTION OF THE INVENTION

In the accomplishment of the objectives of the present invention, it was found desirable to provide a plate dialyzer wherein the membranes extend along the front sides of a stack of plates. Channels open toward the stack of plates and membranes for the inflow and outflow of at least one of the dialysis liquids. The membranes are folded over the ends of the plates, and the ends of the membranes are tightly clamped between two adjacent plates.

Basically, in the case of the plate dialyzer of the present invention, it does not make any difference whether it is a co-current dialyzer, a counter-current dialyzer, or a transverse current dialyzer. In all of these plate dialyzers the plates have profiled front sides providing a system for conducting liquids, and flat, rear sides, the front sides being covered by membranes. Profiled plates can be replaced by flat plates if their material has a fluid transmitting structure, such as foam-like or felt-like materials.

According to a preferred embodiment of the present invention, the front sides of all plates which are adjacent to the channels are enclosed by the membranes, so that there is no connecting joint between the plates and the membranes. This is attained by affixing together in advance a separate plate and a separate membrane, one over the other in such manner that the profiled front sides are covered by the membranes on the one hand and, on the other hand, the rear sides of the plates are covered at the edges by ends of membranes. The stacked plates lie directly one upon the other in alternating face-to-face and back-to-back relationship as shown in FIGS. 1 and 7.

To facilitate the penetration of the dialysis liquids into formed channels between the stacked dialyzer plates, it is particularly advantageous to provide the plates at their profiled front sides with edges inclined toward the channels between the stacked plates so that connecting chambers or recesses are formed extending wedgewise toward the channels for the inflow or outflow of a dialysis liquid.

It is further of advantage to shape the profile of the front sides of the plates as parallel grooves for guiding the flow of dialysis liquid between two adjacent membranes and also for guiding the dialysis liquid flowing between the membranes and the plates, the grooves extending from an advance connecting chamber to a connecting chamber located at the opposite end of the plate. The grooves can be straight or curved. They can also intersect each other diagonally or at right angles to each other. In the latter case there are no continuous ribs upon the plates between the grooves, but individual upstanding humps. If the covering arrangement of adjacent groove sections of the plates is the same, capillary passages are formed of practically flat-oval cross-section.

When the plates all define parallel grooves that define an acute angle to the sides with which the grooves communicate, the grooves of identical plates in face-to-face relation cross each other, the groove walls providing support to prevent collapse of the plates together under pressure.

If a wide flowing blood film is to be produced between two plates, it is advantageous to shift relatively to each other the grooves of the superposed front sides of the plates and to support the plates relatively to each other upon sealing edge shoulders.

The wide, uninterrupted blood film which is produced by this construction, or the corresponding dialysis liquid, if the dialyzer of the present invention is not being used for blood dialysis, is guided upon its upper side as well as upon its lower side between membrane surfaces available for the substance exchange. This greatly increases the efficiency of the dialyzer. The other dialysis liquid - in case of blood dialysis, a scavenging solution - is introduced into transverse channels provided in the front sides of the plates parallel to the connecting chambers at the edge of the ends of the plates. These transverse channels are also connected with the grooves and enter sidewise into perpendicular channels. Preferably, the transverse channels change from the front side of the plates to the rear side of the plates directly before the sealing shoulders, and the perpendicular channels extend through the sealing shoulders and the membranes.

The clamped membrane ends are preferably guided inwardly up to and over the perpendicular channels to make them tight upon the rear surfaces of the plates.

The described plate dialyzer of the present invention operates preferably on the principle of co-current or counter-current. It has the advantage that it is composed of only a few individual parts. If it is desired that the dialyzer be operated according to the cross-current principle, it is merely necessary to locate the transverse channels upon the wide sides of the plates and to provide intersecting grooves to connect the transverse channels and connecting chambers on the plates with the grooves. Typically, the stack consisting of plates and membranes is covered on the top and bottom by cover plates and is covered on the front sides with connecting plates, the cover plates and the connecting plates being firmly connected with each other. Preferably, the perpendicular side channels end in aligned connecting sleeves of the cover plates.

A further advantage of the plate dialyzer of the present invention results from the provision of a hardening grouting mass on the longitudinal sides of the plates, which produces a firm connection between the plates, the membranes, the cover plates, and the connecting plates.

It is of advantage to make the longitudinal sides of the plates inclined, so that the membranes extend a little outwardly, beyond the tightening shoulders on the longitudinal sides of the stack.

The invention will appear more clearly from the following detailed description when taken in connection with the accompanying drawings, showing, by way of example only, a preferred embodiment of the inventive idea. The illustrated embodiment is that of the dialyzer for the blood wash, which can be operated on the cocurrent principle as well as on the counter-current principle.

In the drawings:

FIG. 6 is a horizontal section through the dialyzer;

FIG. 7 is a partial vertical section through the dialyzer;

FIG. 8 is a perspective view of a preferred alternate embodiment of the dialyzer of this invention in an intermediate stage of manufacture of the casing;

FIG. 9 is an enlarged, partial side elevational view, taken partly in section, of the dialyzer of FIG. 8 after complete assembly;

FIG. 10 is a full side elevational view with portions broken away of the dialyzer of FIG. 8 after complete assembly;

FIG. 11 is a diagrammatic view showing the relationship of a plate used in the dialyzer of FIG. 8 and its overlying membrane, and the respective typical flow paths of dialysis solution and blood.

FIG. 12 is a plan view of a preferred plate design used in the dialyzer of this invention;

FIG. 13 is a diagrammatic view of a stack of plates and associated membranes;

FIG. 14 is a sectional view taken along line 14—14 of the stack of plates of FIG. 13, with the respective parts slightly vertically separated for purposes of clarity;

FIG. 15 is a partial, greatly enlarged plan view of one corner of the plate of FIG. 12;

FIG. 16 is a plan view of another preferred embodiment of a plate for use in this invention;

FIG. 17 is a greatly enlarged perspective view of a portion of the edge of the plate of FIG. 16 and a fragment of overlying membrane;

FIG. 18 is a greatly enlarged plan view of one corner of the plate of FIG. 16;

FIg. 19 is a transverse sectional view of another embodiment of a dialyzer essentially identical to that of FIG. 8, but with a different plate design;

FIg. 20 is a diagrammatic plan view of one corner of the stack of plates of the device of FIG. 19, showing in phantom how ridges of an adjoining facing plate are positioned with respect to the ridges of the plate shown;

FIG. 21 is a sectional view taken through the plates of the device of FIG. 19, showing the relationship of the membranes and respective ridges of the plates;

FIG. 22 is an enlarged transverse diagrammatic sectional view showing the shape of the blood manifold in the device of FIGS. 8 and 19;

FIG. 23 is a fragmentary plan view of the inside corner of a shell used to enclose the plates in the device of FIGS. 8 and 19;

FIG. 24 is an elevational view, taken partly in section, of a modified dialysis device of this invention.

Figure 1:
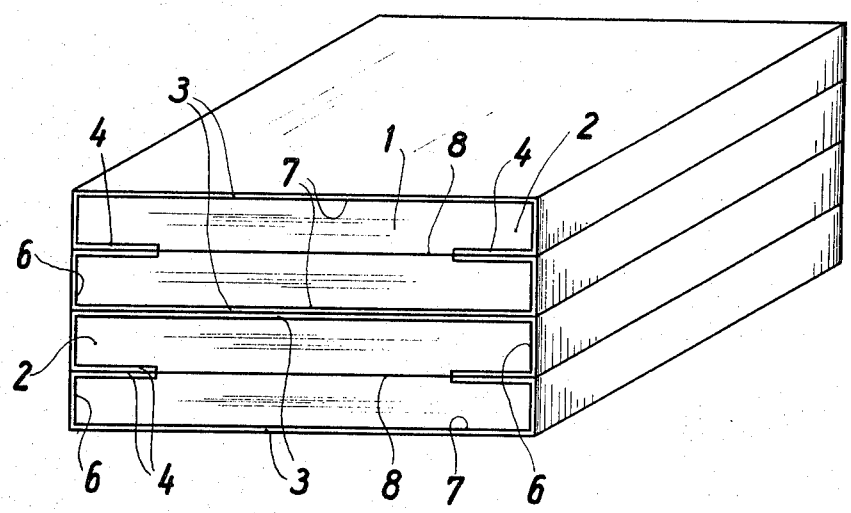
FIG. 1 is a perspective view of a plate-membrane stack.

FIG. 1 shows four plates 1 located one over the other with their corresponding membranes 3 which are used to build up a plate-membrane stack of the plate dialyzer of the present invention. The plates 1 consist of a synthetic material, while the membranes 3 are made in the usual manner of a cellulose foil. The plates 1 have a profiled front side 7 constituting conduits for the guiding of dialysis liquids. The rear surface 8 of the plates 1 is flat. The membranes 3 have the same width as the plates 1 and cover their entire upper surface 7. However, the membranes are longer than the plates 1 and extend frontwise around the plate edges 2, so that they also lie upon the edge portions of the rear surfaces 8 of the plates 1.

Each plate 1, along with one membrane 3, is combined into one unit, and several such units are combined to form a plate-membrane stack. The plates 1 are then so placed one on top of the other that their front sides 7 and their rear sides 8 are always directly one on top of the other; that is, each plate is in face-to-face and back-to-back relation respectively with adjacent plates. Thus the membranes 3 covering the front sides 7 of the plates are in direct engagement with a neighboring membrane, and the ends 4 of the membranes which extend around the plate ends 2 also lie next to neighboring membrane ends, and are clamped between the rear sides 8 of the plates. To simplify the mounting, the membranes 3 can be glued to the plates 1.

It should be noted that in order to facilitate disclosure, the drawing does not show the correct size relationship between the membranes and the plates. Actually, the relation of the membrane thickness to plate thickness is about 1:100, so that it is not absolutely necessary to place the ends 4 of the membranes into special recesses of the plate rear sides 8. It is of importance, however, that the membrane ends 4 should be firmly clamped between the rear sides 8. This is facilitated by the swelling of the membranes 3 when they are wetted.

Figure 2:
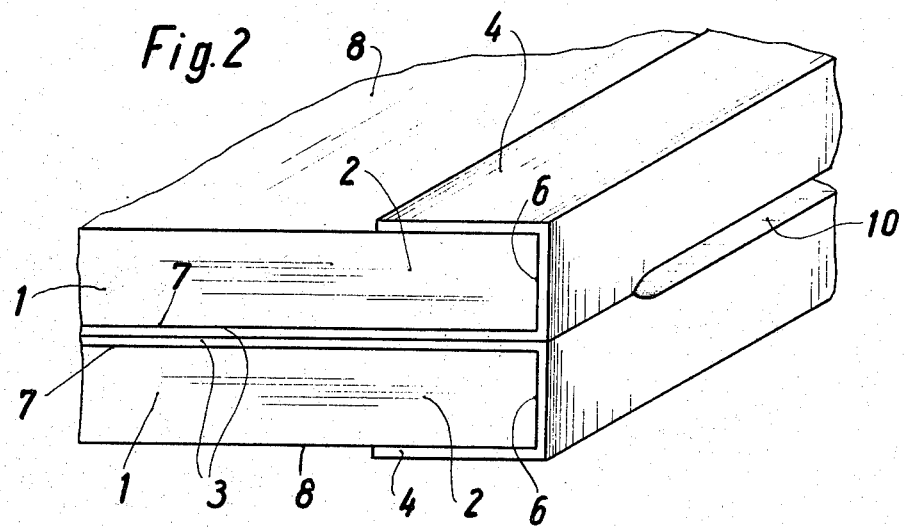
FIG. 2 is an enlarged perspective view of a portion of the plate-membrane stack.

Blood is always guided between two membranes 3. The pressure of the blood causes the membranes to bend into the profiles of the front sides of the plates. This bending can be facilitated by negative pressure of the scavenging solution flowing directly through the profiles on the opposite sides of membranes 3 from the blood. As shown in FIG. 2, blood is directed through the preliminary or connecting chambers 10 to flow between the membranes 3 along the plate side edge surfaces 6.

Figure 3:
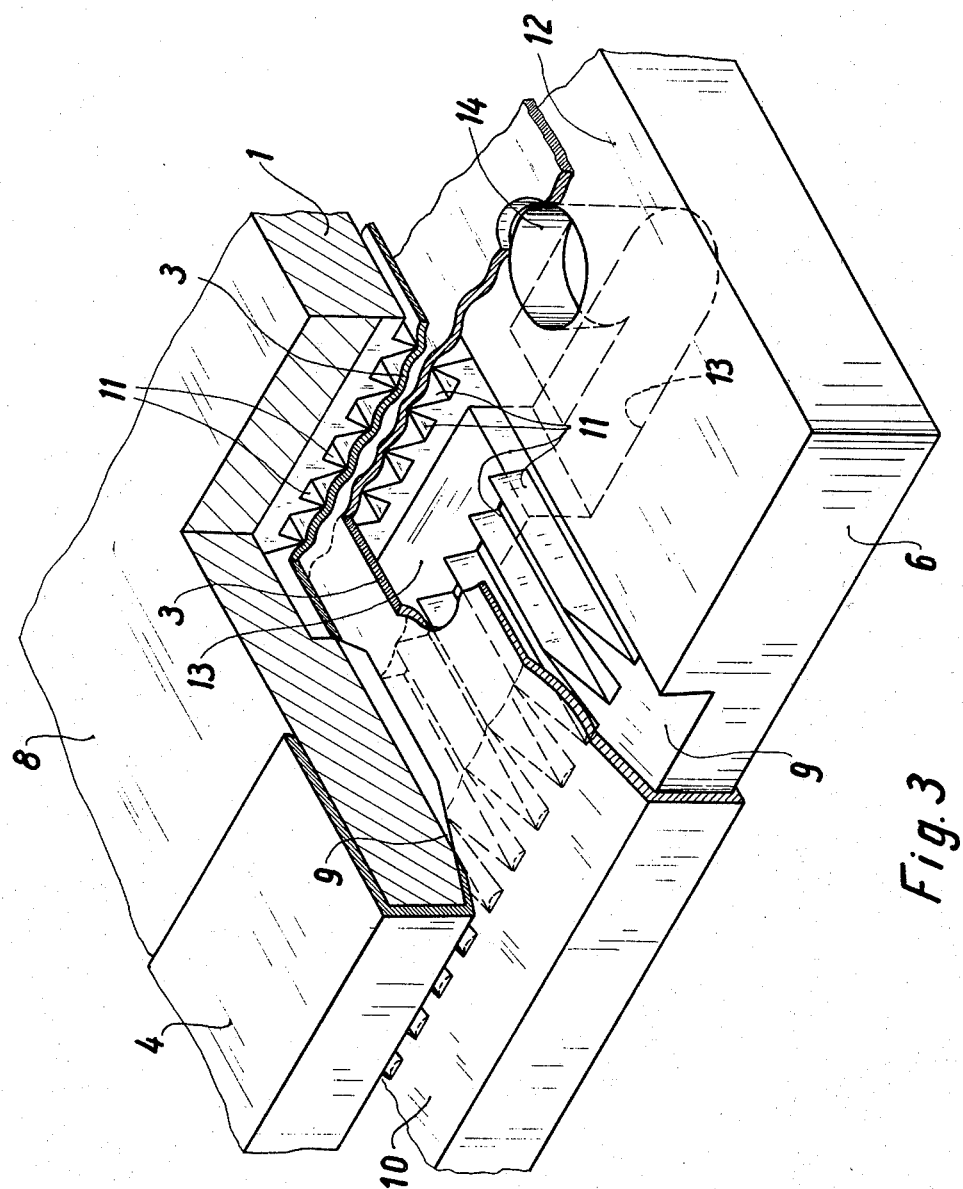
FIG. 3 is an enlarged perspective view, partly broken off and in section, of a portion of the plate-membrane stack.

FIg. 3 shows the inner structure of the plate-membrane stack. It shows that the preliminary chamber 10 is formed by an inclined edge 9 between the side surfaces 6 and the front sides 7 of the plates 1. The inclined edge 9 has the same width as the profile formed by grooves 11 in the front sides 7 of the plates. The grooves 11 are preferably trapezoidal in cross section and extend parallel to each other. They extend toward the chambers 10 on both edges of the plate 1, but are not directly connected with it after the dialyzer is assembled, since the chamber 10 is separated from the grooves 11 by membranes 3. A sealing shoulder 12 is provided on both sides of plates 1 parallel to the grooves 11; it provides a tight separation of the liquid flow passages from the longitudinal sides of the dialyzer.

Furthermore, two directly adjacent plates 1 support each other through the shoulders 12, particularly when the grooves 11 of adjacent plates are shifted relatively to each other. Then the projections of two superposed plates located between the grooves are not situated opposite each other. This has the advantage that the direction of flow between the membranes 3 is not divided into a large number of individual channels, but makes possible the provision of a wide blood film wave-like in cross section. This has an advantageous effect upon the laminar blood flow.

A transverse channel 13 is provided upon both ends of each plate 1 shortly in front of the ending of the grooves 11 at the chambers 10. The channel 13 is used for conducting the scavenging solution, which is guided directly in the grooves 11. Thus the channel is connected with all the grooves. At each side of the plate, transverse channels 13 change from the front side of the plate to its rear side directly before the shoulders 12 and open there into perpendicular channels 14. The membranes 3 pass inwardly upon the rear sides 8 of the plates to extend over the channels 14. As a result of this tight arrangement, no liquid from the channels 14 can penetrate between the rear surfaces 8 of the plates. Since all plates 1 are located in alignment one over the other, the perpendicular channels 14 provide vertical passages located at each corner of the plate-membrane stack, and extending perpendicularly therethrough. To avoid interruption of these channels, before or after assembly the membranes can be perforated by a suitable tool.

In the illustrated embodiment of the present invention, the grooves 11 of the plate dialyzer have a double function. In the first place, they directly conduct the scavenging solution through the grooves covered by the membranes. At the same time, however, they also provide a flow passage for the blood between the membranes 3, since the membranes bend themselves into the grooves 11 under the pressure of the blood, to define blood flow channels. Thus in accordance with this embodiment of the invention, blood and the scavenging solution are guided parallel to each other, and this can be be carried out in a co-current or counter-current manner.

The tight seal between the groove spaces and the intermediate spaces of the membranes is attained substantially by pressing the membrane ends 4 upon the rear surfaces 8 of the plates. The scavenging solution cannot penetrate into the blood passages of the dialyzer due to the complete covering of the inclined edges 9 and the front surfaces 6 of the plates by the membranes. On the other hand, it is not possible for the blood to be pressed into the joint between the ends 4 of the membranes because of sealing shoulders 12.

Figure 4:
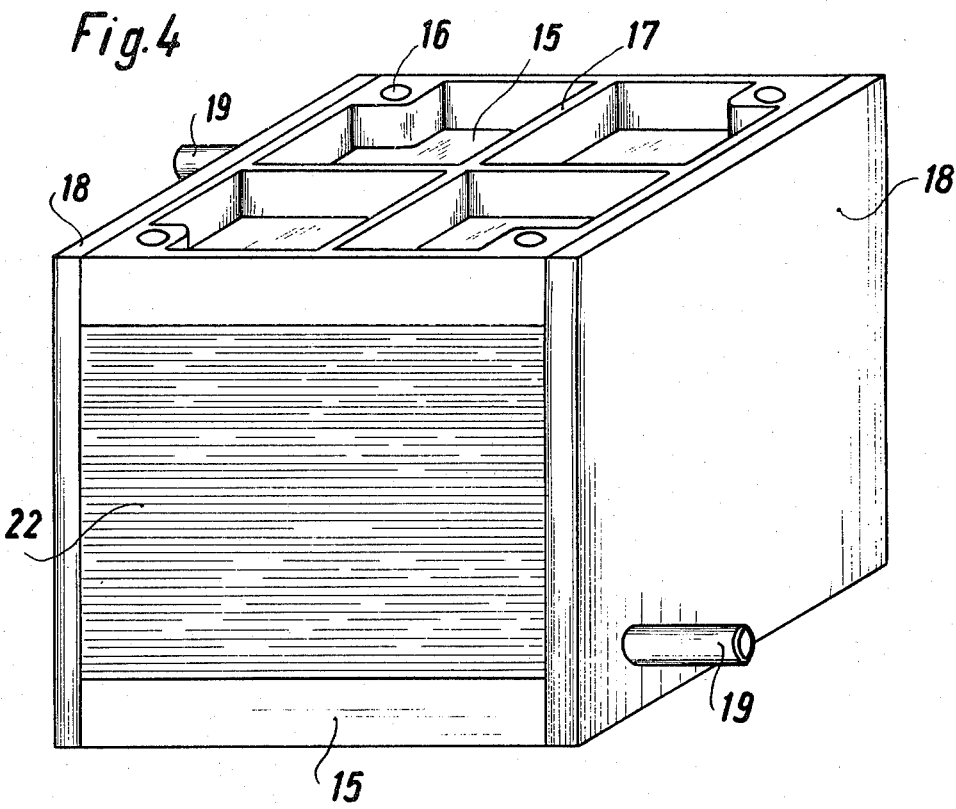
FIG. 4 is a perspective view of a plate dialyzer of the present invention.

FIG. 4 shows a dialyzer provided with the above described plate-membrane stack. The plate-membrane stack is covered on top and bottom with cover plates 15, while its two front sides are covered by connecting plates 18. The corners of the cover plates 15 are provided with connecting sleeves 16 extending in alignment with the vertical passages or channels 14 in the stack. Usually, only one sleeve 16 is used on the upper side and one sleeve 16 on the underside of the stack, so that the other connecting sleeves in the cover plates 15 are closed. This can be effected by plugs fitting tightly into the sleeves 16. In order to provide a fully extending vertical channel, after assembly the membranes 3 must be pierced unless they were initially made with corresponding holes. As has been stated already, this can be effected by any suitable tool. Preferably, the two sleeves 16 on the upper and lower side of the dialyzer which will be operated are those extending diagonally to each other in order that all flows of scavenging solutions entering or leaving through the sleeves 16 and passing through the dialyzer be of equal length. It is possible to operate two pairs of sleeves 16, each pair being located on diagonally opposed corners of the stack when the washing solution flow is to be increased, in order to provide a more uniform pressure distribution in the system of the scavenging solution, particularly when the wash liquid is sucked with negative pressure through the dialyzer.

The cover plates 15 are also provided with ribs 17 used for strengthening purposes.

Figure 5:
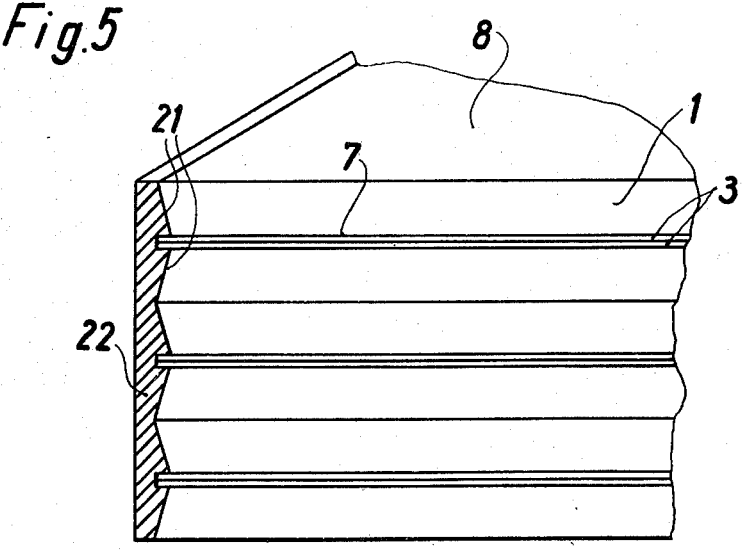
FIG. 5 is a partial vertical section through a longitudinal side wall and adjacent plates and membranes of the dialyzer.

The longitudinal sides of the plate dialyzer of the present invention are covered with a cast mass 22. The plates 1 have longitudinal sides 21 (FIG. 5) which are somewhat inclined, so that they recede from the membranes 3, while the ends of the membranes project somewhat outwardly upon the longitudinal sides of the dialyzer. Thus the cast mass 22 will enclose these projecting ends of the membranes, as best shown in FIG. 5. Consequently, the cast mass 27 assures a firm connection of all component parts of the dialyzer, in that it interconnects and holds together the plates 1, the membranes 3, the cover plates 15, and the connecting wall plates 18. Furthermore, the cover plates 15 and the connecting walls 18 can be firmly connected with each other by soldering or gluing.

FIG. 6 shows the manner in which the channels 5 located in the front and rear of the stack are formed by recesses 20 in the connecting walls 18. The connecting sleeves 19 extend into the channels 5. The channels 5 can have a cross-section diminishing in the direction away from the sleeve 19, to provide the greatest possible uniformity of the current. Actually, a recess 20 in the shape of a half circle in cross-section which extends from the sleeve 19 in vertical direction would interconnect all the chambers or recesses 10 of the stack and would be sufficient. The two sleeves 19 on the plates 18 are also located diagonally to each other, in order to provide the same length for all currents of blood passing from one sleeve 19 to the other and also, in case the dialyzer is not used as an artificial kidney, for the corresponding dialysis liquid. It should also be noted that the grooves 11 are not shown in their correct size in FIG. 6, but are enlarged to provide a clearer illustration.

As shown in the sectional view of FIG. 7, the connecting channels or recesses 10 open wedge-like toward the channels 5. This provides an easy, undisturbed flow of blood between the membranes 3. The channels 5 and the recesses 10 have such small cross-sections that they have no important influence upon the blood fill volume of the dialyzer. In actual practice the transverse channels 13 will be located as closely as possible to the edges of the plates 1 in order to rinse the membranes 3 with the wash liquid along the longest possible path.

The construction of the plate dialyzer of the present invention is extremely simple. It consists substantially of three basic elements, namely, the plate-membrane units, the cover plates, and the connecting plates. The putting together of these parts is very simple, particularly since the new arrangement of the membranes makes possible an effective tight seal of the paths of the dialysis liquid with very simple auxiliary means. Thus, the present invention makes possible a very cheap mass manufacture of these plate dialyzers, so that this instrument can be given at the same time into the hands of many patients, particularly when it is used as an artificial kidney.

The stacked plate diffusion device of this application is particularly capable of exhibiting a high efficiency of diffusion, so that liquid such as blood passed through the device can be essentially completely processed by a single pass through the device. This is accomplished because the device of this invention can be designed with an extremely thin flow path for blood, since the profiled surface on the stack of plates may have flow channels which are no more than 0.5 mm. and even less in depth. Also, the dialyzer of this invention can be fabricated in a manner suitable for supporting ultrathin membranes, which will accelerate the diffusion process in a manner unavailable to the designs of the prior art.

In further illustration of the above advantages, the following newer embodiments of the diffusion device of this invention are provided.

Referring to the diffusion device of FIGS. 8 through 16, a stack of plates and membranes is assembled in the manner previously described, and then placed between a pair of hollow shells 30, 32, which may be of molded plastic. Shells 30, 32 face together to define a chamber inside, the parting line between the two shells being bracketed by a pair of flanges 34, 36.

Prior to insertion of the stack of plates and membranes (portions of which are illustrated in FIGS. 1 and 13), the stack of plates is compressed, desirably at a pressure of about 14 to 28 kg. per square cm. to cause the facing rear sides of the plates, and the membrane ends between them, to become pressed together, to prevent the passage of significant amounts of fluid between the facing rear sides. The above pressure values are particularly effective for rectangular plates having a length of about 12 cm. and a width of about 6 cm. being about 1 mm. in thickness, and being made of polystyrene plastic with adjoining ultrathin membranes of about 10 microns thickness. When the above dimensions are significantly varied, the optimum pressure on the stack of plates and membranes to achieve the desired effect above may also change.

The stack typically has between about 100 and 150 separate plates and overlying membranes.

A relatively thick pressure plate 37 is placed at each end of the stack of plates, preferably prior to the pressure step, for protecting and positioning the plates, and to uniformly distribute the compressive pressure placed on said stack in the pressure step and thereafter by said casing.

After the pressure step on the stack of plates and membranes, they are placed inside hollow shells 32, 34, along with spacers 37, and the shells brought together under pressure so that flanges 34, 36 are in facing contact with each other as shown in FIG. 8. Groove and 0 ring system 35 (FIGS. 8 and 22) is disposed around manifold chamber 44 and the corresponding outlet manifold chamber, for sealing purposes.

Flanges 34, 36 can then be sealed together by any conventional means. It is preferred to injection mold a frame of plastic 38 (FIGS. 9 and 10) about the periphery of flanges 34, 36 to enclose the peripheral portions of the flanges and to permanently bond them together in firm, abutting relation. FIG. 24 also shows an identical frame 38 as applied to a pair of modified shells.

Ridges 40 are formed in sections of flanges 34, 36 to retain the molded frame 38 in tight-fitting relationship. Another set of ridges (not shown) are typically placed on flange portions 41 on the other side of the dialyzer.

Typically, blood enters the device of FIG. 8 through port 42, and is distributed by way of manifold chamber 44 (FIG. 22) along the side edge surfaces of the stacked plates and membranes through the beveled manifold areas 46 (FIG. 13) of the plates which function in the manner of connecting chambers 10, as shown in FIG. 3. Manifold chamber 44 decreases in depth in all directions as it radiates from inlet 42, and terminates with a spacer ridge 50, to position the plates 52. Alternatively, an outer portion of chamber 44 can be in actual contact with plates 52, with the shells 30, 32 being sufficiently flexible to expand slightly when pressurized as blood enters inlet 42, so that a flow channel having a depth of a few microns or so is formed by the pressure. The advantage of this is that the volume of blood contained in the device is brought to an absolute minimum, which is desirable. Otherwise, the minimum depth of chamber 44 can be about 1 mm. or less while in unpressurized condition.

The reduction of the depth of manifold chamber 44 in a manner dependent on its distance from inlet 42 also assists in the distribution of blood or other fluid across the sides of plates 52 in a manner which corresponds to the demand for fluid passing between the plates, resulting in improved uniformity of flow with a minimum of blood volume in the device.

The optimum flow of blood or other fluid through manifold chamber 44 is combined with a minimum blood volume in the manifold chamber when the manifold chamber defines a generally uniform curve in all directions which approximates the following: $d \cong [d_0 /2S \times (1-S^2/S_0^2)] + C$. $d$ (FIG. 22) is the depth of all points of chamber 44 along lines 43 which extend radially from the peripheral wall 45 of fluid port 42 to meet a line, in perpendicular relation thereto, constituting an extension of a peripheral edge 47 of chamber 44. $d_0$ is the depth of the manifold chamber directly underneath peripheral wall 45 multiplied by the circumference of port 42; $S$ is the distance of the point measured along a said perpendicular line 43, measured from wall 45; $S_0$ is the total distance along line 43 from wall 45 to the peripheral edge 47 of said manifold; and $C$ is the minimum desired depth of manifold 44 at peripheral edge 47.

C is preferably about 0.5 to 1 mm. while, for a dialyzer of the specific type described herein, $d_0$ is suitably about 0.5 sq. cm., and $S_0$ about 3 cm. for a dialyzer having about one hundred eighteen 12 cm. by 6 cm. by 1 mm. plates made of polystyrene plastic and having adjoining ultrathin membranes of about 10 microns thickness.

Blood from manifold chamber 44 passes between facing membranes of adjacent plates as described in the previous embodiment of FIGS. 1 through 7, and then is collected in a manifold chamber defined by shell 32, which is similar in structure to chamber 44. The blood is then conveyed from the device by outlet 54.

Dialysis solution (or oxygen, if the device is intended for use as a blood oxygenator) can enter the device by inlet 56, where it enters a manifold space 60 (FIGS. 10, 22, and 23) for distribution of the dialysis solution to the ends of the stack of plates 52. The dialysis solution then passes into plate inlet ports 62, which constitute a groove defined in the back side of each plate which is open to ends 64 of each plate. Thus dialysis solution passes into the plate stack without disruption of sealing shoulders 66.

Inlet ports 62 extend through sealing shoulders 66 a distance sufficient to insure adequate sealing of the ends of the plates. A hole 68 passes entirely through each plate 52 to serve as a connection between inlet port 62 and flow control 70. Channel 70 is a groove inscribed in the front side of each plate for the distribution of dialysis solution across one side of the plate.

The dialysis solution then passes from flow channel 70 across profiled surface 72 to a second flow channel 74 (FIG. 12) for collection of dialysis solution.

The second flow channel then communicates with plate outlet port means 76, which is typically identical in design and function to inlet port 62 and hole 68.

As is seen from FIG. 12, each plate 52 is symmetrical in its initial condition, having ports communicating with the exterior at both ends of flow channels 70 and 74. This simplifies the assembly of the stack of plates, since they can be placed together in face-to-face relation without as much concern about assembly accuracy as is required when asymmetrical plates are brought together in face-to-face relation.

After the plates have been assembled in a stack, the respective second open ends 78 of channels 70, 74 are heat sealed with a hot bar or otherwise occluded, as at 78a in FIG. 9, so that channels 70, 74 are open at only ports 62, 76. This heat sealing step is typically performed after the pressure squeezing step described previously, but before the stack of plates is placed inside of shells 30, 32.

Small support plates 79 are placed at each end of plates 52 to prevent the dialyzate manifold spaces 60 at each end of the plates from collapsing under the pressure encountered during the injection molding step which creates frame 38 for sealing the shells together.

FIG. 11 shows schematically the blood flow path 49 running transversely across plate 52 and separated therefrom by membrane 39, while the dialyzate flow path 80 is shown to pass into the plate by inlet port 62 and to move as previously described.

Profiled surface 72 of plate 52 is shown in FIG. 15 to constitute rows of upstanding projections 82 which are typically generally pyramidal structures having a height of 0.05 to 0.5 mm.; for example, 0.15 mm. Projections 82 cover most of the plate. Preferably, the alternate rows of projections are laterally shifted with respect to their adjacent rows, so that both blood and dialysis solution flow in crossing grooves 83 running between dialysis fluid flow channels 70, 74, for improved gentle mixing of both the blood and dialysis fluid as it passes across the plate face.

The centers of these projections are spaced a distance $D_1$ of about 0.3 to 1.5 mm. apart in the rows which are transverse to the general direction of blood flow 81 across the plate face, and generally parallel to flow channels 70, 74, to provide narrow grooves 83.

The advantage of this is particularly found when ultrathin membrane of no more than about 20 microns thickness is used, in that the great multitude of tiny and closely spaced projections provides adequate support for the thin membrane, preventing the membrane from ripping, or from sagging into the flow channels between the projections. Thus, since this plate structure permits an ultrathin membrane to be used, the diffusion rate between fluid passing on opposite sides of the membrane is substantially improved over the known and conventional diffusion membranes, which are substantially thicker.

The flow resistance across plates 52 is reduced by spacing the centers of the projections 82 in rows extending parallel to the blood flow direction 81 a greater distance apart than the spacing in the transverse rows described above. This spacing $D_2$ is typically about two to three times the distance $D_1$, that is, about 0.5 to 5 mm., preferably about three times that of $D_1$. A preferred spacing $D_1$ is 0.5 mm., while a preferred spacing $D_2$ is 1.5 mm..

Pyramidal projections 82 are typically about 0.5 mm. long on their long axis and 0.2 to 0.3 mm. long on their short axis as shown in FIG. 15.

It is preferred for the dialysis membrane to be placed across the plates 52 and projections 82 while stretched in such a direction that the center-to-center spacing between projections 82 in the stretched direction of the membrane is greater than the center-to-center spacing of the projections transverse to the stretched direction of the membrane. In other words the membrane, which is typically a cellulose-based membrane for blood dialyzers, is laid across plate 52 while being gently stretched in a direction generally parallel to direction 81. As stated above, the projection spacing in a direction perpendicular to direction 81 is about one-third the distance of the projection spacing in direction 81.

The advantage of this is that, when wetted, cellulose-based dialysis membranes and the like tend to expand, and the degree of expansion in the direction perpendicular to their stretched direction is greater than in their stretched direction. If the degree of expansion of the wetted membrane is too great, it will sag and occlude the dialyzate flow channels 83 between the projections 82. Thus, projections 82 are spaced more closely together perpendicular to direction 81 to account for this increased degree of sagging of the membrane. If the membrane is stretched onto the plates in a direction transverse to direction 81, the spacing of projections 82 can be modified accordingly to prevent undue membrane sagging.

Ridges 84 are positioned to mate with corresponding ridges on the faces of adjacent plates to serve as spacer members, thus preventing the projections 82 on facing plates from collapsing between each other during the squeezing or pressurization step of the stack of plates.

FIG. 23 shows a portion of the inside view of shells 30, 32. Dialyzate inlet tube 56 is shown solvent-sealed in position in an appropriate receptacle for the inlet port. Spacer ridge 50 is shown in position to space the plates in uniform manner.

Referring to FIGS. 16 through 18, an alternate plate embodiment 85 is disclosed having a profiled surface comprising projections 86 (FIG. 18). Plate 85 has a pair of sealing shoulders 88 in a manner similar to the previous plates, but with several dialysis fluid entrance ports 90, which are grooves defined on the rear side of plate 84 in a manner similar to that shown in FIG. 15 as inlet 62. Holes 92 correspond to holes 68, and four dialyzate channels 94 convey dialysis solution, extending transversely to the crossing grooves 87 defined by projections 86 across plate 85. Channels 94 are of differing length to provide uniformly distributed dialysis solution to the space between each plate and its associated membrane. The arrangement insures that adequate supplies of dialysis solution are provided to the areas of plate 84 which are remote from entry ports 90. If desired, projections 86 may be spaced in the arrangement as shown in FIG. 15.

Correspondingly, a plurality of take-up channels 96 are provided to convey fluid away from the plate by means of holes 98 which communicate with ports 100, defined on the back of plate 85, to permit solution to be conveyed to the exterior without breaking the seal provided by sealing shoulder 88.

Tooth-like structures 102 are provided on one side of plate 85 as a means to provide a manifold chamber for blood which is analogous in function to chamber 10 described above. The blood is as previously described, conveyed across plates 85 between associated membranes (one of which is shown as membrane 106 in FIG. 17) and correspondingly expelled from the other side of plate 85.

In this embodiment, the plates are stacked so that tooth-like structures 102 of adjacent facing plates are located at opposite sides from each other. One set of the teeth 102 then will serve as an inlet manifold for the blood while the other set on the other plate will serve as an outlet manifold.

Support ridges 108 function in the same manner as ridges 84 (FIG. 12) to prevent the projections 86 of plates in face-to-face relation from being forced together.

Referring to FIGS. 19 through 21, a longitudinal sectional view of a device similar to FIG. 8 is shown having a modified plate design. Blood enters through inlet 42 as before and departs through outlet 54. Dialysis solution enters through inlet 56 into manifold chamber 60, which is supported by blocks 79, as previously shown, to prevent collapse of manifold chambers 60 during the injection molding of frame 38. Dialysis solution passes from manifold chamber 60 through a plurality of channels 110 defined on the rear side of each plate underneath sealing shoulders 112. Channels 110 communicate with holes 114, which pass entirely through each plate just adjacent the sealing shoulders 112 to provide access from channels 110 to the front side of the plate.

The majority of the plate is provided with alternating rows of parallel, short ridges 116, typically no more than 0.05 to 0.5 mm. high, about 1 to 1.5 mm. long, and substantially less in width (0.3 mm.) in which the ridges of alternating rows define angles to the ridges of adjacent rows. Preferably, all of the short ridges 116 define acute angles to the edges of their respective plates between the sealing shoulders 112, and an odd number of rows of short ridges are provided on the plate in at least one and preferably both directions, so that the short ridges 116 of plates disposed in face-to-face relation are in abutting, angular relation to corresponding ridges 116' of the adjacent face-to-face plate to provide spacing and support between the plates. This is illustrated in FIG. 21, in which a pair of adjacent membranes are shown to be retained and held together by crossing ridges 116, 116' of adjacent plates. The phantomed ridges 116' of FIG. 20 illustrate the same principle. When crossing ridges 116 are used, the long ridges 84 (FIG. 12) are no longer necessary, and more uniform plate support is provided. Dialysis solution is then collected in corresponding collection channels 118 (of identical structure to members 110, 114), which solution is then withdrawn through another manifold 60 and oulet 57.

In FIG. 19, ridges 116 are shown enlarged and with fewer rows than would be customarily used, for purposes of clarity. A typical ridge spacing 117 between ridges of adjacent rows is about 0.2 mm.

Referring now to FIG. 24, a modified device of this invention comprising a pair of shells 120, 122 is disclosed. Blood inlet 54 is essentially the same as in FIGS. 8 and 19, as is blood outlet 42, frame 38, and an exemplary stack of plates and membranes having ridges 116 and functioning as described above. However, the dialysis solution inlet and outlet have been moved with respect to the casing of FIGS. 8 and 19 to avoid the molding problems which result when the dialysis inlet and outlet are involved with the molding operation of frame 38. Thus, new dialysis inlet 124 is located below frame 38, while dialysis solution outlet 126 is located above frame 38. Dialysis manifold chambers 128 are provided, corresponding to manifold chambers 60 in FIGS. 19 and 22, but having sufficient depth and volume to eliminate any possible nonuniformity of flow caused by the asymmetric locations of inlet 124 and outlet 126.

It can be seen that shells 120 and 122 can be manufactured from the same mold, and assembled simply by facing the two shells in opposite direction during assembly.

The above has been offered for illustrative purposes only, and is not to be considered to limit the invention, which is defined in the claims below.

That which is claimed is:

1. In a diffusion device such as a dialyzer, a stack of plates separated by semi-permeable membranes to provide a pair of separated, isolated flow paths through said diffusion device on opposite sides of said membranes, said plate having a membrane-supporting, profiled surface comprising a plurality of rows of upstanding projections, in which said membranes are disposed across said plates over said projections while stretched in one direction, the spacing of the centers of the projections in rows in the general direction of stretching being greater than the center-to-center spacing of said projections in rows transverse to the general direction of stretching, to prevent undue sagging of said membrane upon wetting in said transverse direction, while permitting low flow resistance across said plates, said surface also comprising a plurality of support ridges extending in continuous, uninterrupted fashion across said plate in the general direction of said flow paths, to abut corresponding support ridges on an adjacent plate of the stack, to control the spacing between facing plates.

2. The diffusion device of claim 1 in which the separate, isolated flow paths across the plates are generally parallel and countercurrent.

3. The diffusion device of claim 2 in which the projections of alternate rows are laterally shifted with respect to the projections of adjacent rows to provide generally crossing fluid flow channels across said plates.

4. The diffusion device of claim 3 in which said spacing of the projections in rows in said general direction of stretching is at least two times greater than the spacing of the projections in rows transverse to said general direction of stretching, and said general direction of stretching is in longitudinal relation to the general direction of the fluid flow channels.

5. The diffusion device of claim 4 in which said membrane is no more than 20 microns thick, and said projections are spaced from 0.3 to 1.5 mm. apart in rows transverse to said general direction of stretching.

6. The diffusion device of claim 4 in which said stack of plates is bracketed by a pair of relatively thick pressure plates to uniformly distribute compressive pressure placed on said stack.

7. The diffusion device of claim 6 in which said stacked plates are enclosed in a pair of hollow shells which cooperate to enclose said stacked plates, said shells each defining peripheral flanges which abut one another, and a frame member formed about exterior portions of said flanges for holding the flanges in firm, abutting relation.

8. The diffusion device of claim 7 in which said hollow shells each define a central fluid port having a peripheral wall, and a manifold chamber having peripheral edges constituting means for conducting fluid across said plates, said manifold chamber having a tapered depth, in which said depth of said manifold chamber at essentially all points along radial lines extending from said peripheral wall to meet said peripheral edges in perpendicular relation thereto is essentially equal to the following expression: $[d_0/2S \times (1 - S^2/S_0^2)] + C$, in which $d_0$ is the depth of the manifold chamber directly underneath the peripheral wall multiplied by the circumference of said central fluid port, $S$ is the distance of the point measured along a said radial line measured from the peripheral wall of said fluid port, $S_0$ is the total distance from the peripheral wall of said fluid port along said radial line to the peripheral edge of said manifold, and $C$ is the minimum depth of said chamber at said peripheral edge.

9. The diffusion device of claim 7 in which said plates have front sides with sealing shoulders on opposed side edges, said rows of upstanding projections being defined on said plate between the shoulders, the front side of each plate being covered by a said membrane folded at opposed ends about the edges of said plate between the sealing shoulders, so that opposed membrane ends lie adjacent the rear side of said plate, the plates being arranged in face-to-face and back-to-back relation respectively with adjacent plates to clamp said membrane ends between rear sides of adjacent plates and to clamp membrane edges between said sealing shoulders, first manifold means for conducting a fluid across said plates through said fluid flow channel between the plate and its associated membrane, and second manifold means for conducting fluid across said plates between the membranes of plates lying in face-to-face relation.

10. The diffusion device of claim 7 in which said plates define near each edge between said sealing shoulders a plurality of grooves extending transversely to the direction of said fluid flow channels and communicating therewith, said grooves being of differing lengths and communicating at one end through said sealing shoulders to the edge of said plate, to provide uniformly distributed fluid to the space between each plate and its associated membrane, and to correspondingly collect said fluid and convey it through a sealing shoulder to the exterior.

11. In a diffusion device such as a dialyzer comprising a plurality of stacked plates and overlying membranes, said plates defining a plurality of rows of spaced projections of uniform height for forming flow channels, in which said membranes overlying said plates are selectively tensioned in one direction with respect to other directions over said projections, the center-to-center spacing of said projections in said one direction being greater than the center-to-center spacing of said projections in a direction transverse to said one direction.

12. The diffusion device of claim 11 in which the general path of fluid flow across membranes of plates approximates said one direction.

13. The diffusion device of claim 12 in which said projections are spaced in rows in said one direction at least two times farther apart than in said transverse direction.

14. The diffusion device of claim 13 in which said membrane is made of a cellulosic material.

15. The diffusion device of claim 14 in which each plate has a front side with sealing shoulders on opposed side edges, said rows of projections being defined between the sealing shoulders, the front side of each plate being covered by a said membrane folded at opposed ends about the edges of said plate between the sealing shoulders, so that opposed membrane ends lie adjacent to the rear side of said plate, the plates being arranged in face-to-face and back-to-back relation respectively with adjacent plates to clamp said membranes between the rear sides of adjacent plates and to clamp membrane edges between said sealing shoulders, first manifold means for conducting a fluid across said plates through said fluid flow channels between the plate and its associated membrane, and second manifold means for conducting fluid across said plates between the membranes of plates lying in face-to-face relation.

16. In a diffusion device such as a dialyzer comprising a plurality of stacked plates and overlying membranes, in which one face of the plates defines a profiled surface to define flow channels thereacross, a line of spaced, projecting teeth defined on one edge of said plates to define flow channels communicating across said plate edge between the plate surface and the exterior adjacent said plate edge, the projecting teeth of each said plate being overlaid and surrounded by a membrane, whereby blood passing between said teeth across each plate is separated from said plate by its associated membrane.

17. The diffusion device of claim 16 in which said plates are so stacked that the line of spaced, projecting teeth of adjacent, facing plates are located on opposite sides of said adjacent plates.

18. The method of sealing a diffusion device comprising a plurality of stacked plates and associated diffusion membranes covering a side of each plate, in which said plates have fluid flow channels running from end to end thereof adjacent opposed plate edges, said plate being symmetrical and said channels extending through opposed plate ends to communicate therethrough, which method comprises: sealing one end of each channel in each stacked plate, and thereafter encasing said stacked plates and membranes in a pair of hollow shells which cooperate to enclose said plates, said shells each defining peripheral flanges which abut one another in assembled, stack-enclosing position; and thereafter molding about the outer periphery of said flanges a unitary, integral retention member, and holding said shells and flanges together until said retention member has hardened, whereby said integral retention member holds said flanges together in firm, abutting relation.

19. The method of claim 18 in which said unitary integral member is an injection molded frame of plastic which encloses peripheral portions of said flanges.

20. The method of claim 18 in which, prior to said encasing step, said stack of plates is compressed to pressure weld the plates and membranes together into a compressed, generally unitary stack.

21. The method of claim 20 in which said membrane is no more than 20 microns in thickness.

22. The method of claim 21 in which said stack of plates and membranes is compressed at a pressure of about 14 to 28 kilograms per square centimeter.

23. The method of claim 18 in which opposed ends of each channel adjacent opposite edges of the plate are sealed.

* * * * *